(12) United States Patent
Fahim et al.

(10) Patent No.: US 10,514,990 B2
(45) Date of Patent: Dec. 24, 2019

(54) MISSION-CRITICAL COMPUTING ARCHITECTURE

(71) Applicant: Intel Corporation, Santa Clara, CA (US)

(72) Inventors: Bahaa Fahim, Santa Clara, CA (US); Swadesh Choudhary, Mountain View, CA (US); Rahul Pal, Bangalore (IN); Vedaraman Geetha, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 206 days.

(21) Appl. No.: 15/823,313

(22) Filed: Nov. 27, 2017

(65) Prior Publication Data

US 2019/0163583 A1 May 30, 2019

(51) Int. Cl.
*G06F 11/20* (2006.01)
*G06F 11/18* (2006.01)
*G06F 11/14* (2006.01)
*G06F 9/38* (2018.01)

(52) U.S. Cl.
CPC ........ *G06F 11/2017* (2013.01); *G06F 9/3818* (2013.01); *G06F 11/141* (2013.01); *G06F 11/184* (2013.01)

(58) Field of Classification Search
CPC .............. G06F 11/141; G06F 11/1608; G06F 11/1616; G06F 11/1625; G06F 11/1629; G06F 11/1637; G06F 11/1641; G06F 11/1654; G06F 11/184; G06F 11/2002; G06F 11/2005; G06F 11/2017; G06F 11/202; G06F 11/2043; G06F 11/2046; G06F 11/2089; G06F 9/3818; G06F 9/3887; G06F 9/3851
See application file for complete search history.

(56) References Cited

U.S. PATENT DOCUMENTS

| | | | | |
|---|---|---|---|---|
| 4,099,234 A | * | 7/1978 | Woods | G06F 11/0745 714/11 |
| 6,247,143 B1 | * | 6/2001 | Williams | G06F 9/52 714/11 |
| 6,357,033 B1 | * | 3/2002 | Jippo | G06F 11/1608 714/758 |
| 2002/0152418 A1 | * | 10/2002 | Griffin | G06F 11/1645 714/11 |
| 2002/0152420 A1 | * | 10/2002 | Chaudhry | G06F 11/1641 714/11 |

(Continued)

*Primary Examiner* — Gabriel Chu
(74) *Attorney, Agent, or Firm* — Schwegman Lundberg & Woessner, P.A.

(57) ABSTRACT

Operational faults, including transient faults, are detected within computing hardware for mission-critical applications. Operational requests received from a requestor node are to be processed by shared agents to produce corresponding responses. A first request is duplicated to be redundantly processed independently and asynchronously by distinct shared agents to produce redundant counterpart responses including a first redundant response and a second redundant response. The first redundant response is compared against the second redundant response. In response to a match, the redundant responses are merged to produce a single final response to the first request to be read by the requestor node. In response to a non-match, an exception response is performed.

25 Claims, 9 Drawing Sheets

(56) References Cited

U.S. PATENT DOCUMENTS

| | | | | |
|---|---|---|---|---|
| 2005/0240793 | A1* | 10/2005 | Safford | G06F 9/30076 714/1 |
| 2006/0248288 | A1* | 11/2006 | Bruckert | G06F 9/321 711/150 |
| 2011/0179308 | A1* | 7/2011 | Pathirane | G06F 9/30189 714/37 |
| 2012/0210164 | A1* | 8/2012 | Gara | G06F 11/1641 714/10 |

* cited by examiner

MISSION-CRITICAL COMPUTING ARCHITECTURE

TECHNICAL FIELD

Embodiments described herein generally relate to information processing system architecture, and, more particularly, to fault-tolerant processing circuitry and associated methods.

BACKGROUND

Recent innovations in computing processor microarchitecture and fabrication have produced immense advances in computing performance in consumer- and commercial-grade microprocessors. These innovations include scale-down of device size, increased density, increased clock rate, reduced differential logic voltage, and increased architectural and operational complexity. Each of these factors tends to increase the susceptibility of advanced microprocessors to operational faults, such as logic glitches, that may occur unpredictably and as isolated events. These types of faults are difficult to detect, yet they may result in corruption of data and malfunctioning of the application or system software being executed.

Although the occurrence of faults remains exceedingly rare, there are a number of mission-critical applications for which the operational fault tolerance is substantially reduced compared to more conventional computing applications, typically by multiple orders of magnitude. Mission-critical applications are those where personal safety is at stake. These include, for example, control of autonomous vehicles or driver-assist systems, robotic surgery or life-support systems, control of industrial processes, the failure of which may result in an explosion or release of toxic material, and the like.

It would be advantageous if consumer/commercial-grade microprocessors, with their associated the performance and relatively low cost, could be used in mission-critical applications. A variety of techniques have been deployed to increase immunity from operational faults in microprocessor systems; however, they have tended to be limited in their practical applicability to fundamental operational blocks such as state machines, control blocks, pipelines, etc., or have added substantial complexity, cost and compromises in computing performance. A practical solution is needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
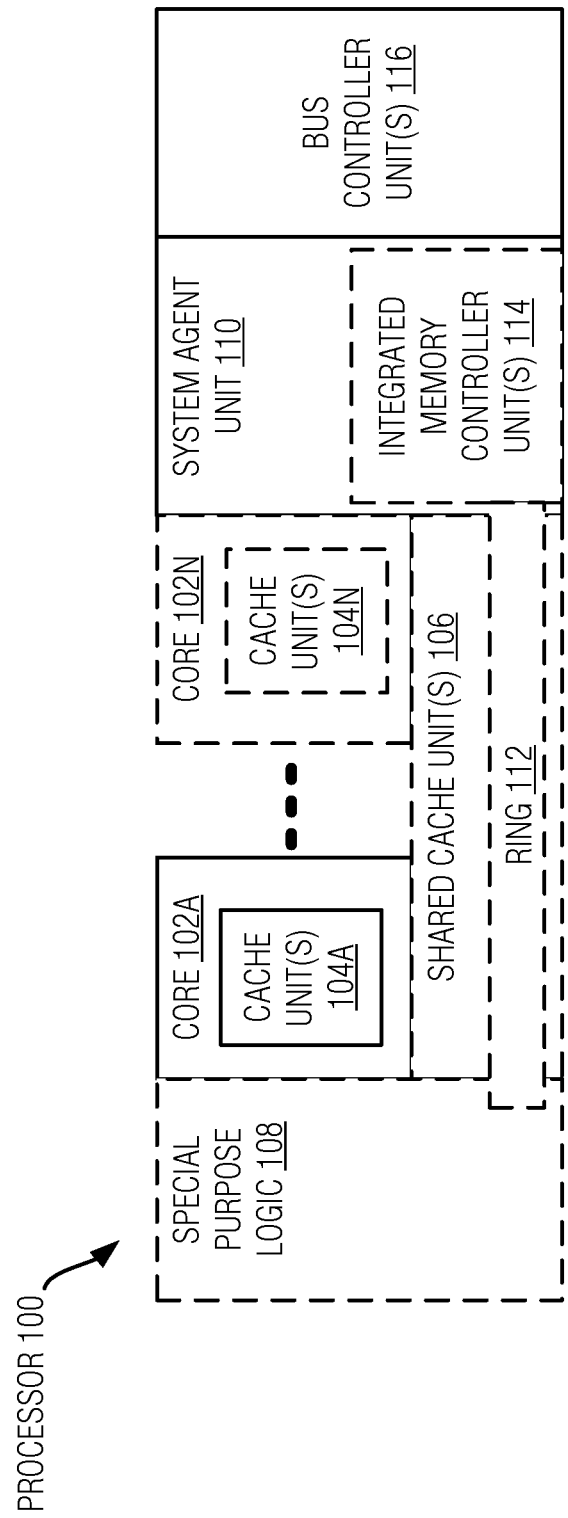
FIG. 1 is a block diagram of a hardware processor that may have more than one core, may have an integrated memory controller, and may have integrated graphics, on which various embodiments may be implemented.

Aspects of the embodiments are directed to a computer processor-based architecture and associated functionality for managing operational faults due to random hardware errors occurring in the processor or related circuitry. For example, structures such as state machines, control blocks, pipelines, caching agents, last-level cache, and the like, which may be part of a central processor unit (CPU) may encounter operational faults.

Although these types of faults may have an identifiable cause, such as electromagnetic transients or other interference, their unpredictability makes them appear random. Operational faults are not structural faults that remain in place as hardware failures, which cause repeated errors and are hence more readily detectable. Rather, operational faults are sparse, transient occurrences, which may corrupt information when they strike, but do not remain present to cause repeated errors. As such, operational faults are difficult to detect, yet their information-corrupting effects remain present, and propagate through the system.

In general, conventional approaches of addressing operational faults in critical interfaces and storage elements involved well-known error-detection or error-correction coding techniques such as parity, checksum, cyclic redundancy codes (CRC), forward error correction, or the like, which provide a level of functional safety through detection (and possible correction) of these faults. These types of approaches have been deployed through significant changes to hardware microarchitecture over local structures or end-to-end (generation at source and checking at the destination) with different tradeoffs in either implementation. However, none of these techniques address significant increases in random fault tolerance for digital logic components themselves.

Techniques for managing operational faults are invasive, highly complex, and have demonstrated, in general, low return on investment. These mechanisms are not only fragile, but also carry significant complexity and impact with overall low return in terms of improved system robustness. Other, more invasive, solutions such as lockstep at the CPU level involve significant complexity to guarantee cycle-accurate determinism (e.g., tightly coupled lockstep), which is difficult to achieve on general-purpose processors, or a significant software stack investment to synchronize two non-deterministic CPU sockets (e.g., loosely coupled lockstep). Each of these approaches has been problematic given the non-deterministic nature of modern highly complex processors, and most incur significant performance and memory capacity impact to support CPU-level lockstep.

In addition, there is a growing trend to utilize multi-threaded processors having the capability of running a mixture of mission-critical workloads and conventional workloads. In such applications, it would be desirable to not burden the conventional workloads with the operational-fault-management overhead, which presents a substantial computational burden that reduces overall compute performance. Static hardware techniques (such as dedicated circuitry to monitor and report defects) is a cost that is applied to all applications running on a processor with no distinction between processors running mission-critical and non-mission-critical workloads.

According to some example embodiments, a redundant coherence flow architecture, and associated functionality, are provided for detecting operational errors in CPU structures accessible via an interconnect. In related embodiments, the redundant coherence flow is selectively utilized on a per-cacheline address basis. This approach provides tracking and coherence mechanisms which, independently, track completions of requests while achieving a high degree of functional safety by ensuring that multiple independent coherence responses are identical prior to retiring results to the cores, which may remain entirely unaware of the redundancy.

These embodiments may addresses both operational and permanent faults due to redundant processing over multiple distinct hardware coherence controllers, without requiring determinism. Optionally, selective addressability (e.g., per-cacheline) of the redundant processing allows the non-mission-critical applications to avoid any redundancy-related performance costs.

FIG. 1 is a block diagram of a processor 100 that may have more than one core, may have an integrated memory controller, and may have integrated graphics according to embodiments of the invention. Integrated components in the present context are components that are formed in a common integrated circuit (IC), and include components formed on a common die, and components formed on separate but closely-interconnected dies within a common IC package. The solid lined boxes in FIG. 1 illustrate a processor 100 with a single core 102A, a system agent 110, a set of one or more bus controller units 116, while the optional addition of the dashed lined boxes illustrates an alternative processor 100 with multiple cores 102A-N, a set of one or more integrated memory controller unit(s) 114 in the system agent unit 110, and special purpose logic 108.

Thus, some implementations of the processor 100 may include (as non-limiting examples): 1) a CPU with the special purpose logic 108 including integrated graphics and/or scientific (throughput) logic (which may include one or more cores), and the cores 102A-N being one or more general purpose cores (e.g., general purpose in-order cores, general purpose out-of-order cores, a combination of the two); 2) a coprocessor with the cores 102A-N being a large number of special purpose cores intended primarily for graphics and/or scientific (throughput); and 3) a coprocessor with the cores 102A-N representing a plurality of general purpose in-order cores in this example. Thus, the processor 100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 100 may be a part of and/or may be implemented on one or more substrates using any of a number of process technologies, such as, for example, BiCMOS, CMOS, or NMOS. In addition, some or all of cores 102A-N may be heterogeneous with respect to one another.

The memory hierarchy includes one or more levels of cache within the cores, a set or one or more shared cache units 106, and external memory (not shown) coupled to the set of integrated memory controller units 114. The set of shared cache units 106 may include one or more mid-level caches, such as level 2 (L2), level 3 (L3), level 4 (L4), or other levels of cache, a last level cache (LLC), and/or combinations thereof. While in one embodiment a ring-based interconnect unit 112 interconnects the integrated graphics logic 108, the set of shared cache units 106, and the system agent unit 110/integrated memory controller unit(s) 114, alternative embodiments may use any number of well-known techniques for interconnecting such units. In one embodiment, coherency is maintained between one or more cache units 106 and cores 102-A-N.

In some embodiments, one or more of the cores 102A-N are capable of multi-threading. The system agent 110 includes those components coordinating and operating cores 102A-N. The system agent unit 110 may include for example a power control unit (PCU) and a display unit. The PCU may be or include logic and components needed for regulating the power state of the cores 102A-N and the integrated graphics logic 108. The display unit is for driving one or more externally connected displays.

The cores 102A-N may be homogenous or heterogeneous in terms of architecture instruction set; that is, two or more of the cores 102A-N may be capable of execution the same instruction set, while others may be capable of executing only a subset of that instruction set or a different instruction set.

FIGS. 2-5 are block diagrams illustrating examples of various processor architectures in which aspects of the embodiments may be implemented. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 2:
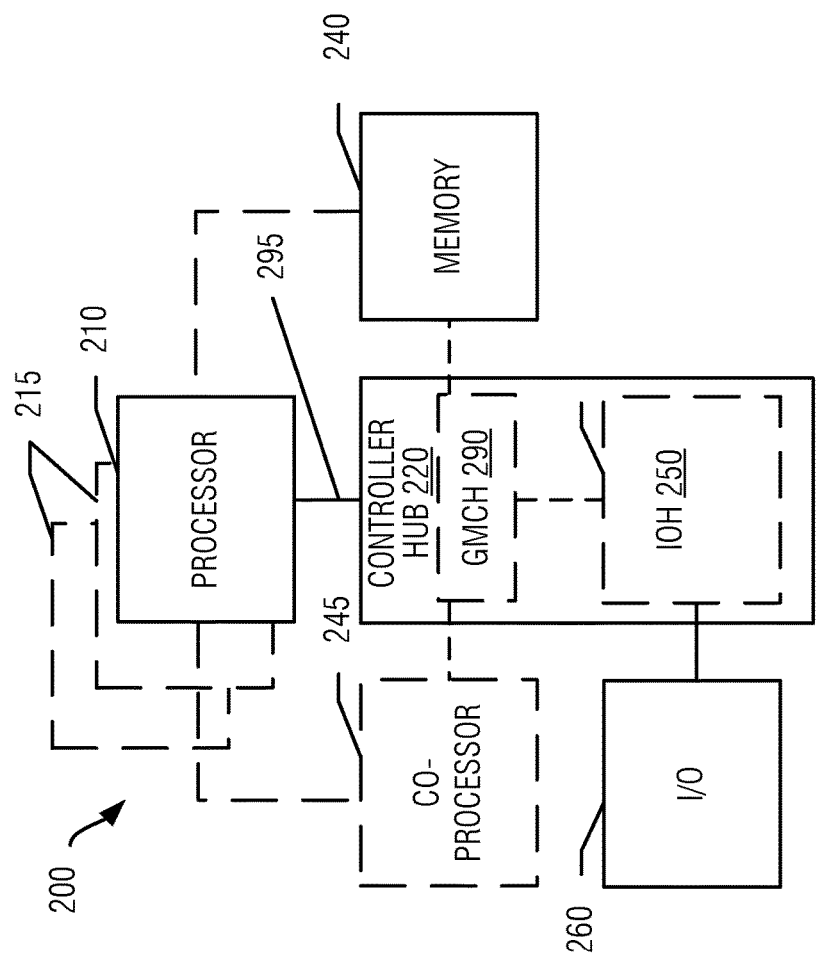
FIGS. 2-5 are block diagrams illustrating examples of computer architectures in which aspects of the embodiments may be implemented.

Referring now to FIG. 2, shown is a block diagram of a system 200 in accordance with one embodiment of the present invention. The system 200 may include one or more processors 210, 215, which are coupled to a controller hub 220. In one embodiment the controller hub 220 includes a graphics memory controller hub (GMCH) 290 and an Input/Output Hub (IOH) 250 (which may be on separate chips); the GMCH 290 includes memory and graphics controllers to which are coupled memory 240 and a coprocessor 245; the IOH 250 is couples input/output (I/O) devices 260 to the GMCH 290. Alternatively, one or both of the memory and graphics controllers are integrated within the processor (as described herein), the memory 240 and the coprocessor 245 are coupled directly to the processor 210, and the controller hub 220 in a single chip with the IOH 250.

The optional nature of additional processors 215 is denoted in FIG. 2 with broken lines. Each processor 210, 215 may include one or more of the processing cores described herein.

The memory 240 may be, for example, dynamic random access memory (DRAM), phase change memory (PCM), or a combination of the two. For at least one embodiment, the controller hub 220 communicates with the processor(s) 210, 215 via a multi-drop bus, such as a frontside bus (FSB), point-to-point interface such as QuickPath Interconnect (QPI), or similar connection 295.

In one embodiment, the coprocessor 245 is a special-purpose processor, such as, for example, a high-throughput MIC processor, a network or communication processor, compression engine, graphics processor, GPGPU, embedded processor, or the like. In one embodiment, controller hub 220 may include an integrated graphics accelerator.

There can be a variety of differences between the physical resources 210, 215 in terms of a spectrum of metrics of merit including architectural, microarchitectural, thermal, power consumption characteristics, and the like.

In one embodiment, the processor 210 executes instructions that control data processing operations of a general type. Embedded within the instructions may be coprocessor instructions. The processor 210 recognizes these coprocessor instructions as being of a type that should be executed by the attached coprocessor 245. Accordingly, the processor 210 issues these coprocessor instructions (or control signals representing coprocessor instructions) on a coprocessor bus or other interconnect, to coprocessor 245. Coprocessor(s) 245 accept and execute the received coprocessor instructions.

Figure 3:
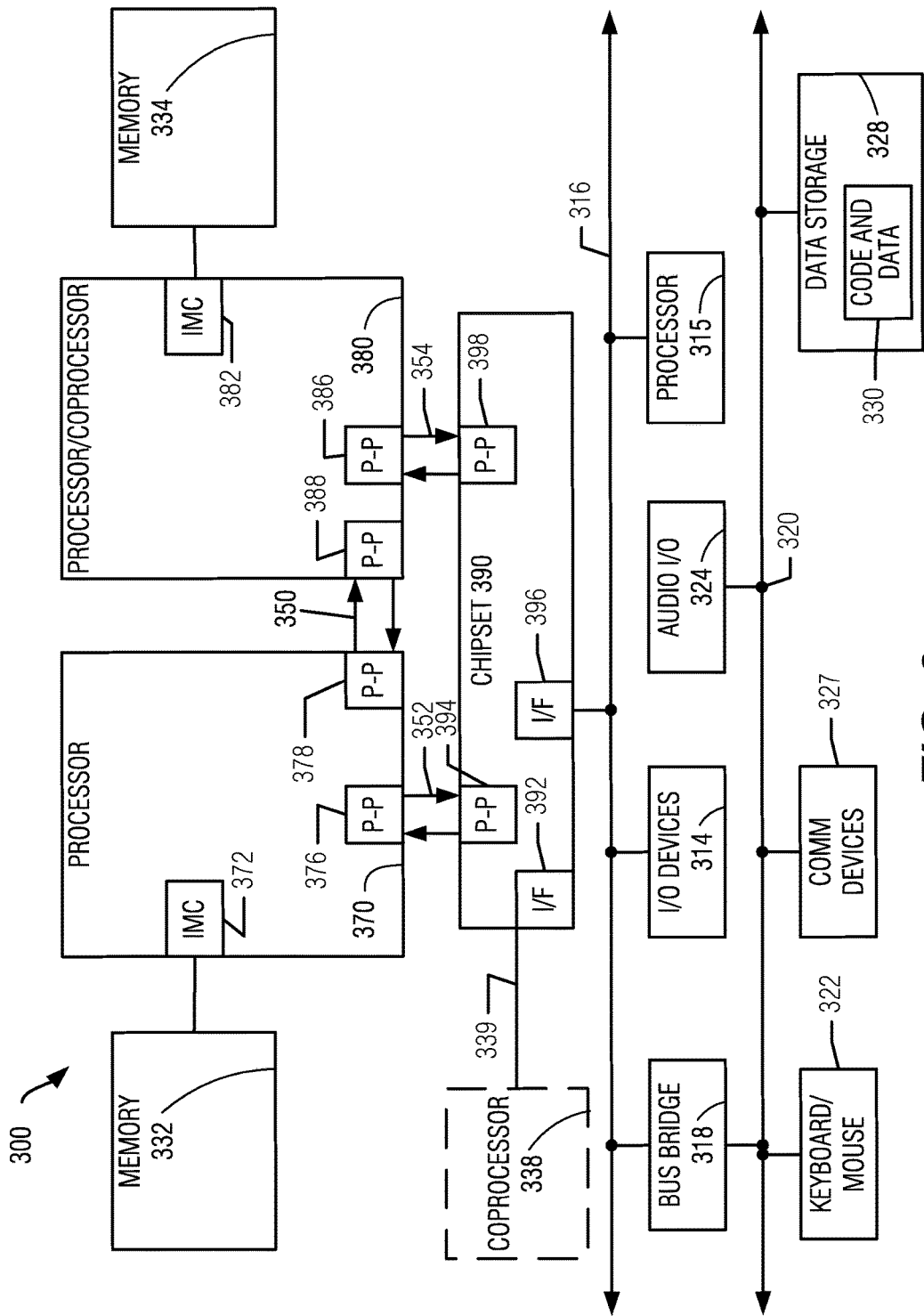

Referring now to FIG. 3, shown is a block diagram of a first more specific example, system 300, in accordance with an embodiment of the present invention. As shown in FIG. 3, multiprocessor system 300 is a point-to-point interconnect system, and includes a first processor 370 and a second processor 380 coupled via a point-to-point interconnect 350. In one embodiment of the invention, processors 370 and 380 are respectively processors 210 and 215, while coprocessor 338 is coprocessor 245. In another embodiment, processors 370 and 380 are respectively processor 210 coprocessor 245.

Processors 370 and 380 are shown including integrated memory controller (IMC) units 372 and 382, respectively. Processor 370 also includes as part of its bus controller units point-to-point (P-P) interfaces 376 and 378; similarly, second processor 380 includes P-P interfaces 386 and 388. Processors 370, 380 may exchange information via a point-to-point (P-P) interface 350 using P-P interface circuits 378, 388. As shown in FIG. 3, IMCs 372 and 382 couple the processors to respective memories, namely a memory 332 and a memory 334, which may be portions of main memory locally attached to the respective processors.

Processors 370, 380 may each exchange information with a chipset 390 via individual P-P interfaces 352, 354 using point to point interface circuits 376, 394, 386, 398. Chipset 390 may optionally exchange information with the coprocessor 338 via a high-performance interface 339. In one embodiment, the coprocessor 338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 390 may be coupled to a first bus 316 via an interface 396. In one embodiment, first bus 316 may be a Peripheral Component Interconnect (PCI) bus, or a bus such as a PCI Express bus or another third generation I/O interconnect bus, although the scope of the present invention is not so limited.

As shown in FIG. 3, various I/O devices 314 may be coupled to first bus 316, along with a bus bridge 318 which couples first bus 316 to a second bus 320. In one embodiment, one or more additional processor(s) 315, such as coprocessors, high-throughput MIC processors, GPGPU's, accelerators (such as, e.g., graphics accelerators or digital signal processing (DSP) units), field programmable gate arrays, or any other processor, are coupled to first bus 316. In one embodiment, second bus 320 may be a low pin count (LPC) bus. Various devices may be coupled to a second bus 320 including, for example, a keyboard and/or mouse 322, communication devices 327 and a storage unit 328 such as a disk drive or other mass storage device which may include instructions/code and data 330, in one embodiment. Further, an audio I/O 324 may be coupled to the second bus 320. Note that other architectures are possible. For example, instead of the point-to-point architecture of FIG. 3, a system may implement a multi-drop bus or other such architecture.

Figure 4:
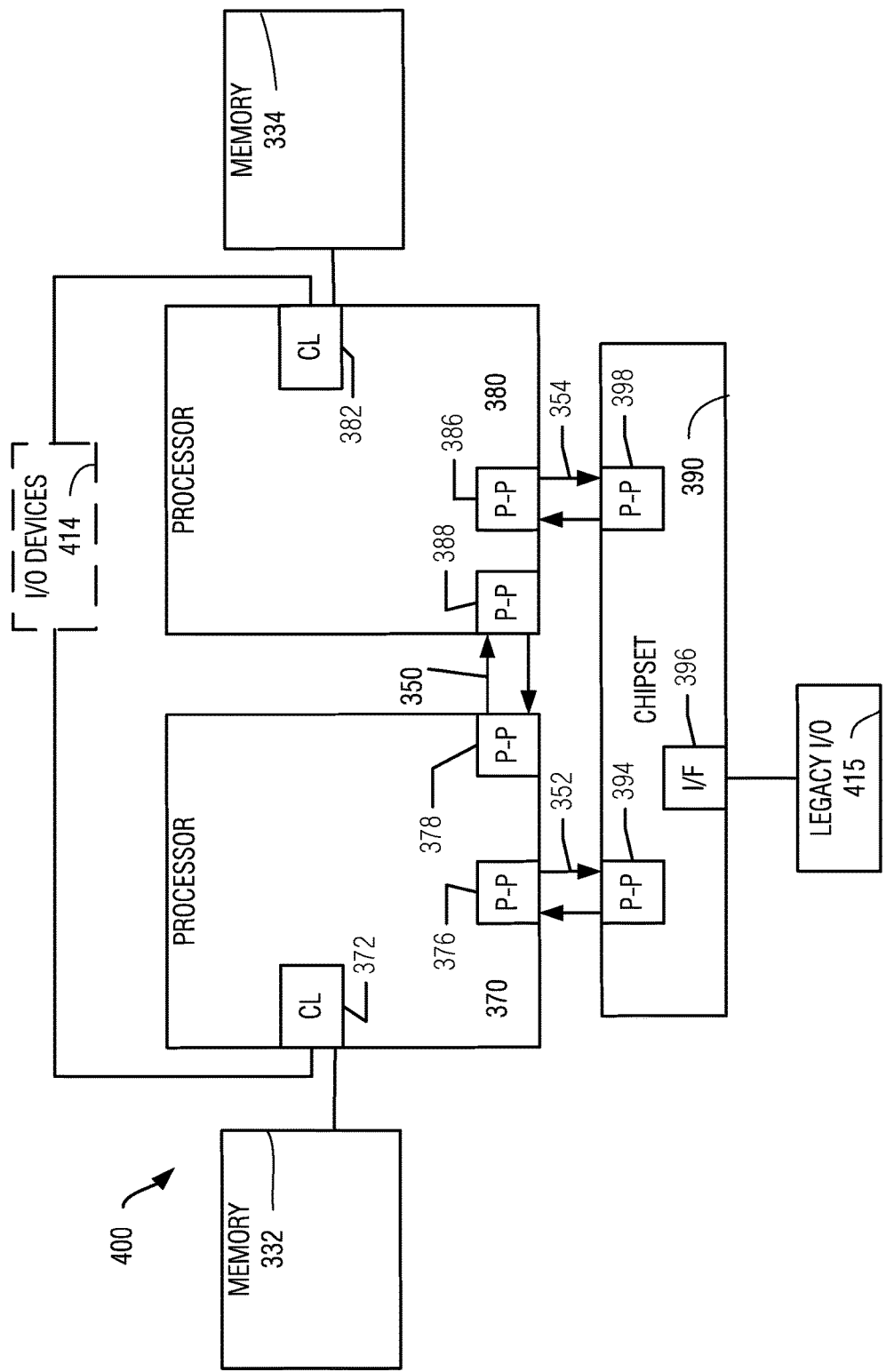

Referring now to FIG. 4, shown is a block diagram of a second more specific example, system 400, in accordance with an embodiment of the present invention. Like elements in FIGS. 3 and 4 bear like reference numerals, and certain aspects of FIG. 3 have been omitted from FIG. 4 in order to avoid obscuring other aspects of FIG. 4.

FIG. 4 illustrates that the processors 370, 380 may include integrated memory and I/O control logic ("CL") 372 and 382, respectively. Thus, the CL 372, 382 include integrated memory controller units and include I/O control logic. FIG. 4 illustrates that not only are the memories 332, 334 coupled to the CL 372, 382, but also that I/O devices 414 are also coupled to the control logic 372, 382. Legacy I/O devices 415 are coupled to the chipset 390.

Figure 5:
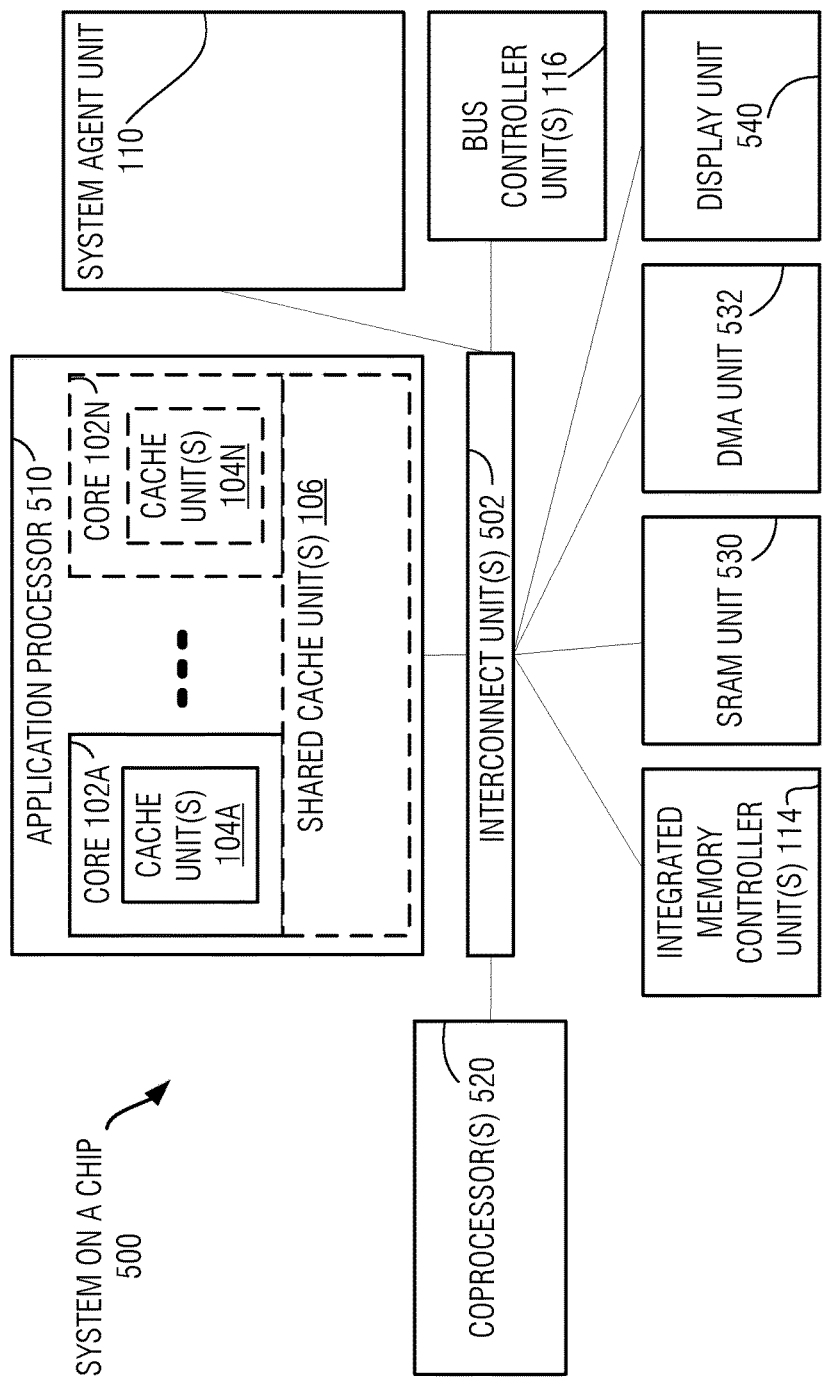

Referring now to FIG. 5, shown is a block diagram of a SoC 500 in accordance with an embodiment of the present invention. Also, dashed lined boxes are optional features on more advanced SoCs. In FIG. 5, an interconnect unit(s) 502 is coupled to: an application processor 510 which includes a set of one or more cores 202A-N and shared cache unit(s)106; a system agent unit 110; a bus controller unit(s) 116; an integrated memory controller unit(s) 114; a set or one or more coprocessors 520 which may include integrated graphics logic, an image processor, an audio processor, and a video processor; an static random access memory (SRAM) unit 530; a direct memory access (DMA) unit 532; and a display unit 540 for coupling to one or more external displays. In one embodiment, the coprocessor(s) 520 include a special-purpose processor, such as, for example, a network or communication processor, compression engine, GPGPU, a high-throughput MIC processor, embedded processor, or the like.

Figure 6:
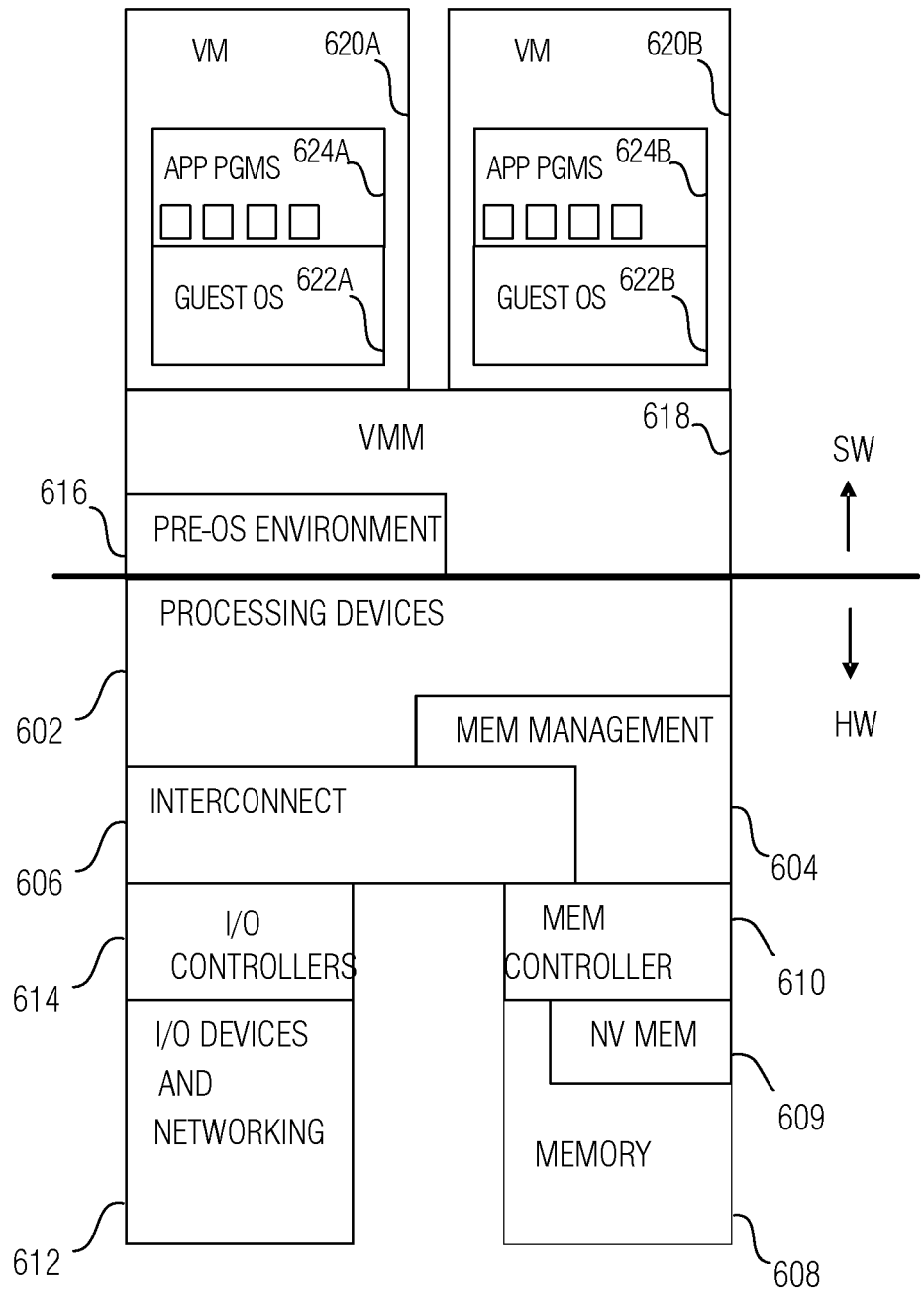
FIG. 6 is a diagram illustrating an example of hardware and software architectures of a computing device in which various interfaces between hardware components and software components are shown.

FIG. 6 is a diagram illustrating an example hardware and software architecture of a computing device in which various interfaces between hardware components and software components are shown. As indicated by HW, hardware components are represented below the divider line, whereas software components denoted by SW reside above the divider line. On the hardware side, processing devices 602 (which may include one or more microprocessors, digital signal processors, etc., each having one or more processor cores, such as cores 102A-102N described above, are interfaced with memory management device 604 (e.g., similar to integrated memory controller unit(s) 114) and system interconnect 606 (e.g., similar to interconnect unit(s) 502). Memory management device 604 provides mappings between virtual memory used by processes being executed, and the physical memory. Memory management device 604 may be an integral part of a central processing unit which also includes the processing devices 602.

Interconnect 606 includes a backplane such as memory, data, and control lines, as well as the interface with input/output devices, e.g., PCI, USB, etc. Memory 608 (e.g., dynamic random access memory—DRAM) and non-volatile memory 609 such as flash memory (e.g., electrically-erasable read-only memory—EEPROM, NAND Flash, NOR Flash, etc.) are interfaced with memory management device 604 and interconnect 606 via memory controller 610. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 612, which interface with interconnect 606 via corresponding I/O controllers 614.

On the software side, a pre-operating system (pre-OS) environment 616, which is executed at initial system start-up and is responsible for initiating the boot-up of the operating system. One traditional example of pre-OS environment 616 is a system basic input/output system (BIOS). In present-day systems, a unified extensible firmware interface (UEFI) is implemented. Pre-OS environment 616, is responsible for initiating the launching of the operating system, but also provides an execution environment for embedded applications according to certain aspects of the invention.

Virtual machine monitor (VMM) 618 is system software that creates and controls the execution of virtual machines (VMs) 620A and 620B. VMM 618 may run directly on the hardware HW, as depicted, or VMM 618 may run under the control of an operating system as a hosted VMM.

Each VM 620A, 620B includes a guest operating system 622A, 622B, and application programs 624A, 624B.

Each guest operating system (OS) 622A, 622B provides a kernel that operates via the resources provided by VMM 618 to control the hardware devices, manage memory access for programs in memory, coordinate tasks and facilitate multi-tasking, organize data to be stored, assign memory space and other resources, load program binary code into memory, initiate execution of the corresponding application program which then interacts with the user and with hardware devices, and detect and respond to various defined interrupts. Also, each guest OS 622A, 622B provides device drivers, and a variety of common services such as those that facilitate interfacing with peripherals and networking, that provide abstraction for corresponding application programs 624A, 624B so that the applications do not need to be responsible for handling the details of such common operations. Each guest OS 622A, 622B additionally may provide a graphical user interface (GUI) that facilitates interaction with the user via peripheral devices such as a monitor, keyboard, mouse, microphone, video camera, touchscreen, and the like. In some embodiments, guest OS 622B may omit a GUI.

Each guest OS 622A, 622B may provide a runtime system that implements portions of an execution model, including such operations as putting parameters onto the stack before a function call, the behavior of disk input/output (I/O), and parallel execution-related behaviors.

In addition, each guest OS 622A, 622B may provide libraries that include collections of program functions that provide further abstraction for application programs. These include shared libraries, dynamic linked libraries (DLLs), for example.

Application programs 624A, 624B are those programs that perform useful tasks for users, beyond the tasks performed by lower-level system programs that coordinate the basis operability of the computer system itself.

Figure 7:
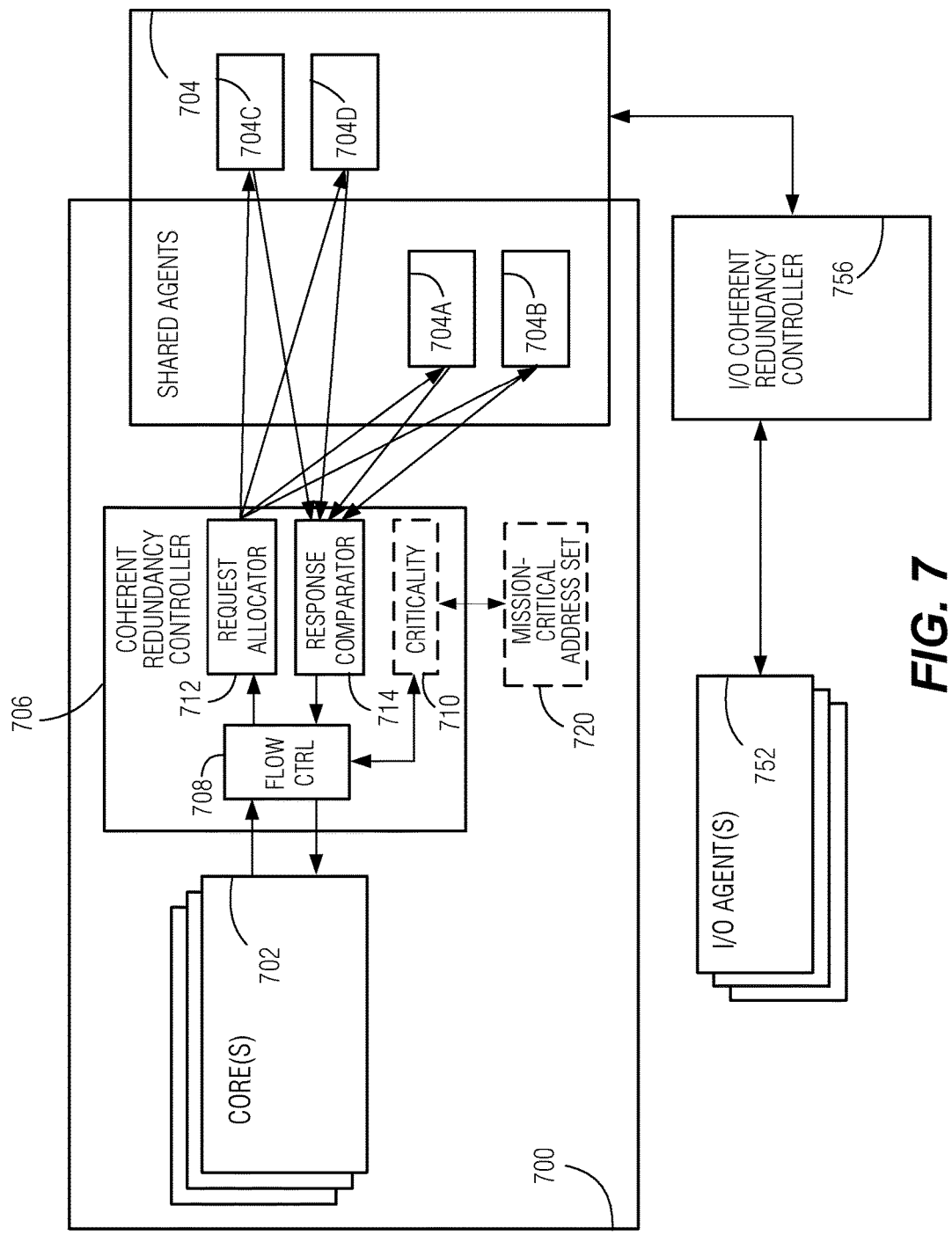
FIG. 7 is a simplified functional block diagram illustrating portions of an example CPU having fault-immunity features according to some embodiments.

FIG. 7 is a simplified functional block diagram illustrating portions of an example CPU having fault-immunity features according to some embodiments. As illustrated CPU 700 includes one or more cores 702 (hereinafter referred to simply as cores 702). Cores 702 may be similar to cores 102 described above with reference to FIGS. 1 and 5, for example. CPU 700 further includes a set of shared agents 704, including shared agents 704A and 704B that are integrated with CPU 700, and shared agents 704C and 704D that are accessible to CPU 700, though they may be physically located on one or more separate integrated circuit dies or in separate packages.

Shared agents 704 include various components that facilitate the operation of CPU 700 including, but not limited to, cache controllers (e.g., of shared cache unit(s) 106), ring 112, memory controllers (e.g., integrated memory controller unit(s) 114), interconnect-fabric, or bus controllers (e.g., bus controller unit(s) 116), system agents (e.g., system agent unit 110), or the like, examples of which are described above with reference to FIGS. 1 and 5. Each one of shared agents 704 may include a coherence agent that is configured to process requests destined to cache, memory, I/O devices or peer socket over a an inter-socket coherent interface (UPI) to ensure overall coherence. More generally, as an example arrangement, shared agents 704 may communicate with cores 702 via request and response messaging, whereby shared agents 704 respond to requests originated by the core. Examples of requests include read, write, and control messages that are addressable to a destination.

CPU 700 also includes coherent redundancy controller 706. Coherent redundancy controller 706 comprises circuitry configured to provide detection or recovery from operational faults for mission-critical processes being executed by CPU 700. In related embodiments, CPU 700 selectively applies these enhanced-safety operations to only the mission-critical processes, allowing non-mission-critical processes to be executed with higher compute performance.

Coherent redundancy controller 706 includes flow control portion 708 that interfaces with cores 702, and coordinates the handling of request and response messaging between cores 702 and shared agents 704. The interface between flow control portion 708 and cores 702 may be an intra-die interface (IDI), for example, or another suitable interface. In a related embodiment, flow control portion 708 presents coherent redundancy controller 706 to cores 702 in such a manner that coherent redundancy controller 706 appears transparent to cores 702—in other words, cores 702, are entirely unaware of the presence of coherent redundancy controller 706.

Criticality decision portion 710 is configured to determine, on a request-by-request basis, if a given request is associated with mission-critical operations. Accordingly, in one embodiment, criticality decision portion 710 access mission-critical address set 720, which may be a list of addresses or address ranges that are associated with mission-critical operations. As an example, critical address set 720 may be configured by the pre-OS environment (e.g., BIOS or UEFI of pre-OS environment 616 of FIG. 6) during system boot. In operation, the addressing for a memory location is ultimately controlled by the OS or VMM. Accordingly, in some embodiments it is the province of the OS or VMM to select enhanced-safety processing for mission-critical applications by assigning addresses that are consistent with critical address set 720. In other embodiments, a pre-OS environment, OS, or VMM may be configured so that all requests are to be handled in mission-critical fashion.

In response to a request from one of cores 702 indicating an address associated with mission-critical operation, as determined by criticality decision portion 710, flow control portion 708 passes the request to request allocator 712 for coherent redundant processing, as will be described in greater detail below. In response to a request that indicates an address that is not mission-critical, flow control portion 708 directs the request to bypass the coherent redundant processing.

Request allocator 712 directs requests to shared agents 704 in accordance with coherent redundancy principles according to aspects of the embodiments. Accordingly, a request associated with a mission-critical application is duplicated among a first and a second shared agent 704 to be processed in parallel, independently, using distinct hardware circuitry. Each shared agent 704 is unaware of any redundant processing taking place by any other shared agent 704. The parallel processing may be asynchronous and may be completed at different times.

Response comparator 714 is configured to receive and compare counterpart responses from shared agents 704. In an example embodiment, response comparator 714 stores a checksum, which may be a hash, or some other shortened representation, of a first response received from a first shared agent 704 to respond to a request that has been duplicated for redundancy. In response to a second response from a second shared agent 704 to which the same request has been redundantly sent, a checksum is computed, and the results of the two checksum values are compared, with the comparison result being provided to flow control portion 708.

Matching checksums from indicate a high probability of equal response values from the redundant shared agents, and in turn, equal response values are indicative of a high probability that no operational faults have been experienced during operation of coherent redundancy controller 706 and shared agents 704, from the time when the request was duplicated. In this case, flow control portion 708 merges the matching responses into a single response message and sends it to the originator of the request from among cores 702, thereby providing the appearance of the request having been processed by a single shared agent 704.

In response to a non-match of the response values, flow control portion 708 performs an exception response. In one example, the exception response initiates one or more retries. A retry may involve allocating redundant copies of the same request to the same shared agents 704 as used in the prior attempt. If the non-match was due to a transient operational fault, the likely result of the retry is a successful match, which would indicate fault-free operation.

A repeated non-match is indicative of a persistent hardware fault. In one embodiment, flow control portion 708 is configured to perform an exception response that includes a fault-isolation test in response to a repeated non-match. In the fault-isolation test, the duplicated request is performed using different circuitry by allocating a different pair of shared agents to redundantly process the repeated request. A repeated non-match of responses from a different set of redundant shared agents is indicative of a widespread system failure. In response to a matching pair of response values as a result of the fault-isolation test, the individual responses from the first instance of the duplicated request and of the retry may be compared against the response value with which consensus between different shared agents 704 in order to identify which of the shared agents 704 used in the first instance and retry duplicated request processing returned a value that was different than the consensus value.

In a related embodiment, in response to a detected shared agent 704 having a persistent fault, request allocator 712 may be configured to avoid directing any future requests to that shared agent 704. This operation effectively disables the faulty shared agent 704 while preserving the functionality of the CPU and computing system as a whole.

In a related example, a reporting data path is provided for non-recovered persistent faults, and any pertinent information such as fault localization, to be reported to the OS, VMM, or pre-OS environment by coherent redundancy controller 706.

FIG. 7 further illustrates I/O coherent redundancy controller 756, having a similar structure and functionality as coherent redundant controller 706. Also, I/O coherent redundancy controller 756 interfaces with shared agents 704 in the same manner as coherent redundancy controller 706. For the sake of visual clarity, the internal components of I/O coherent redundancy controller 756 are omitted, and its interface couplings to shared agents 704A-D are simplified. I/O coherent redundancy controller 756 interfaces with I/O agents 752, which may include such components as one or more memory controllers, I/O interfaces (e.g., peripheral component interface (PCIe)), dynamic random access memory (DRAM) devices, or the like, which are operatively coupled to shared agents 704 over an interface that facilitates reads and writes from and to shared agents 704.

The functionality of I/O coherent redundancy controller 756 is similar in principle to that of coherent redundancy controller 706, with redundant duplication of read and write requests, comparison of returns, retries, and reconciliation of any persistent faults. Notably, in an example system, I/O coherent redundancy controller 756 may be used alongside coherent redundancy controller 706.

Figure 8:
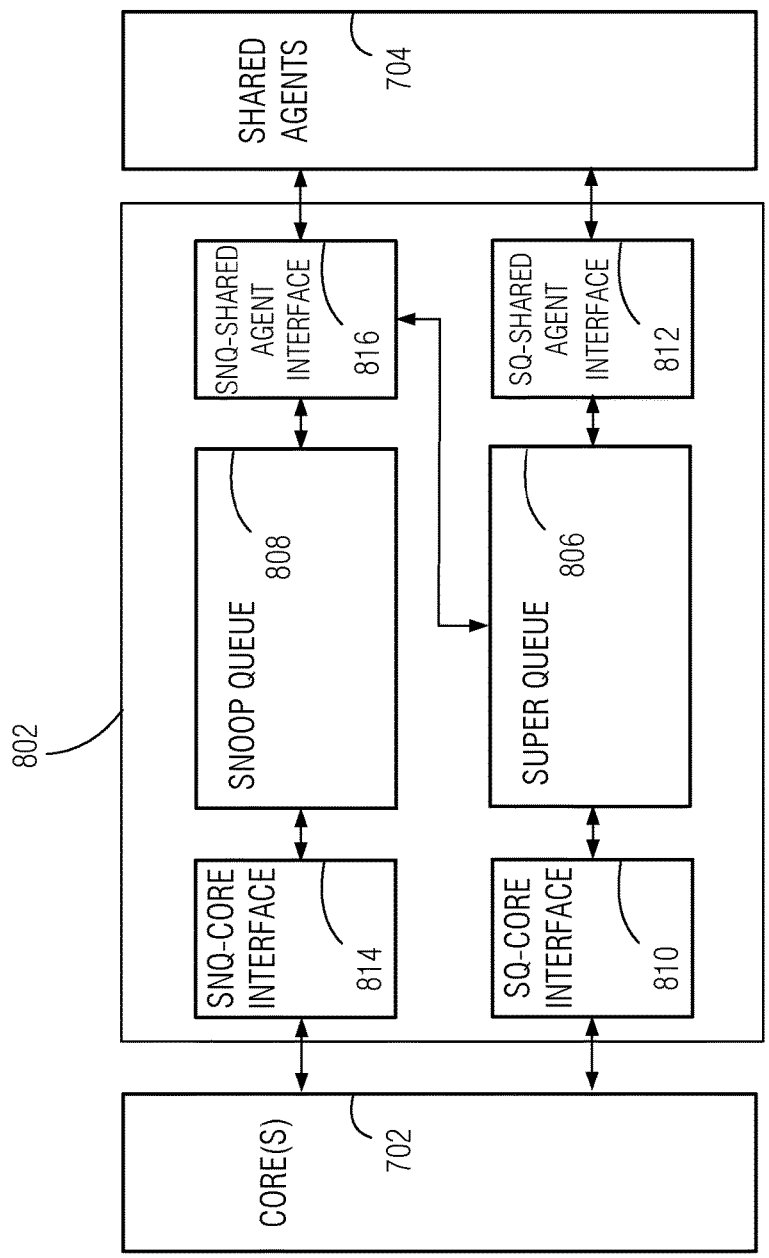
FIG. 8 is a block diagram illustrating an example transparent redundancy manager that may be implemented in the coherent redundancy controller illustrated in FIG. 7 according to some embodiments.

FIG. 8 is a block diagram illustrating an example transparent redundancy manager 802 that may be implemented in coherent redundancy controller 706 according to some embodiments. Transparent redundancy manager 802 is configured to track the redundant duplication of requests, and handle responses in such a way that cores 702, and the rest of the CPU and greater system may operate in their usual fashion, without having to make any special accommodation for the presence and effect of the operations of coherent redundancy controller 706. Transparent redundancy manager 802 may be partially or entirely implemented in flow control portion 708. In various related embodiments, portions of transparent redundancy manager 802 may be located in request allocator 712, response comparator 714, or elsewhere within coherent redundancy controller 706.

Transparent redundancy manager 802 comprises hardware components including super queue 806, snoop queue 808, and interface logic between cores 702 and shared agents 704. The interface logic includes super queue-to-core interface logic 810, super queue-to-shared-agent interface logic 812, as well as snoop queue-to-core interface logic 814, and snoop queue-to-shared agent interface logic 816.

Super queue 806 includes memory that stores identifiers of active requests and response checksums while the redundant processing, result comparison, retries, and any other reconciliation operations are carried out. Each response by any one of the shared agents 704 is intercepted and sent to super queue 806, to be matched up with the request, and any prior redundant responses against with the response is to be compared. If a response is the first response, then the response or, a checksum representing the response, is stored in super queue 806. Subsequent redundant responses, or checksums thereof, may also be stored in super queue 806, from where they may be read to be compared.

Super queue-core interface logic 810 is configured to determine whether an originated request from cores 702 is to be redundantly duplicated for a mission-critical process, may perform address translation or other encoding, may perform the response comparison operations, may remove entries from super queue 806 at the successful completion of a request and response, and may consolidate and forward a single response from among the redundant responses to complete transmission of the response to cores 702. Super queue-core interface logic 810 may also include a state machine that tracks and controls the sequence of operations involving super queue 806. Super queue-shared agent interface logic 812 is configured to duplicate and assign requests to shared agents 704, and compute checksums of received responses and add them to super queue 806.

Snoop queue 808 includes memory that stores snoop messages from shared agents 704 directed to cores 702 that are outstanding (e.g., for which snoop responses have not been returned). The contents of snoop queue 808 are used to prevent duplicated snoops originating from redundant shared agents 704 from being duplicated to cores 702. This may ensure deadlock-free operation for all snoops destined to core 702, such as those received between the retirement of an initial read response and a second read response, while ensuring predictable forward progress for redundant requests. This functionality may be used to resolve conflicts and contention scenarios where multiple cores may be contending for the same shared agent, for example. In some examples, a credited retry mechanism is implemented that ensures that requests associated with snoops occurring between the first and second responses, always complete after a single retry. In a related example, a mechanism is configured to ensure that snoops from a single shared agent 704, which result in an implicit eviction from the level-2 cache, for example, is also forwarded to the counterpart agent 704 to ensure both images are updated.

Snoop queue-shared agent interface logic 816 is configured to receive snoop requests from shared agents 704 and check whether the address associated with each snoop request corresponds to a mission-critical address. If the snoop request is not associated with any redundancy among shared agents 704, the snoop request may be passed directly to cores 702. However, if the snoop request was from a shared agent 704 that has a duplicated counterpart, snoop queue-shared agent interface logic 816 checks snoop queue for an entry corresponding to a redundant snoop that has been requested. The presence of an entry in snoop queue 808 having the same address as the current snoop request is indicative of the latter snoop being duplicative as a result of the redundant processing. Snoop queue-core interface logic 814 is configured to suppress duplicative snoop requests.

In a related embodiment, snoop queue-shared agent interface logic 816 is configured to check whether there is a pending request, indicated by the contents in super queue 806, relating to the same address as a current snoop request. In this case, snoop queue-shared agent interface logic 816 may obtain the snoop response directly from super queue 806.

Snoop queue-core interface 814 is configured to forward non-redundant snoop requests to cores 702, receive and forward snoop responses from cores 702 to shared agents 704, and to clear entries from snoop queue 808 upon completion of a snoop request.

Figure 9:
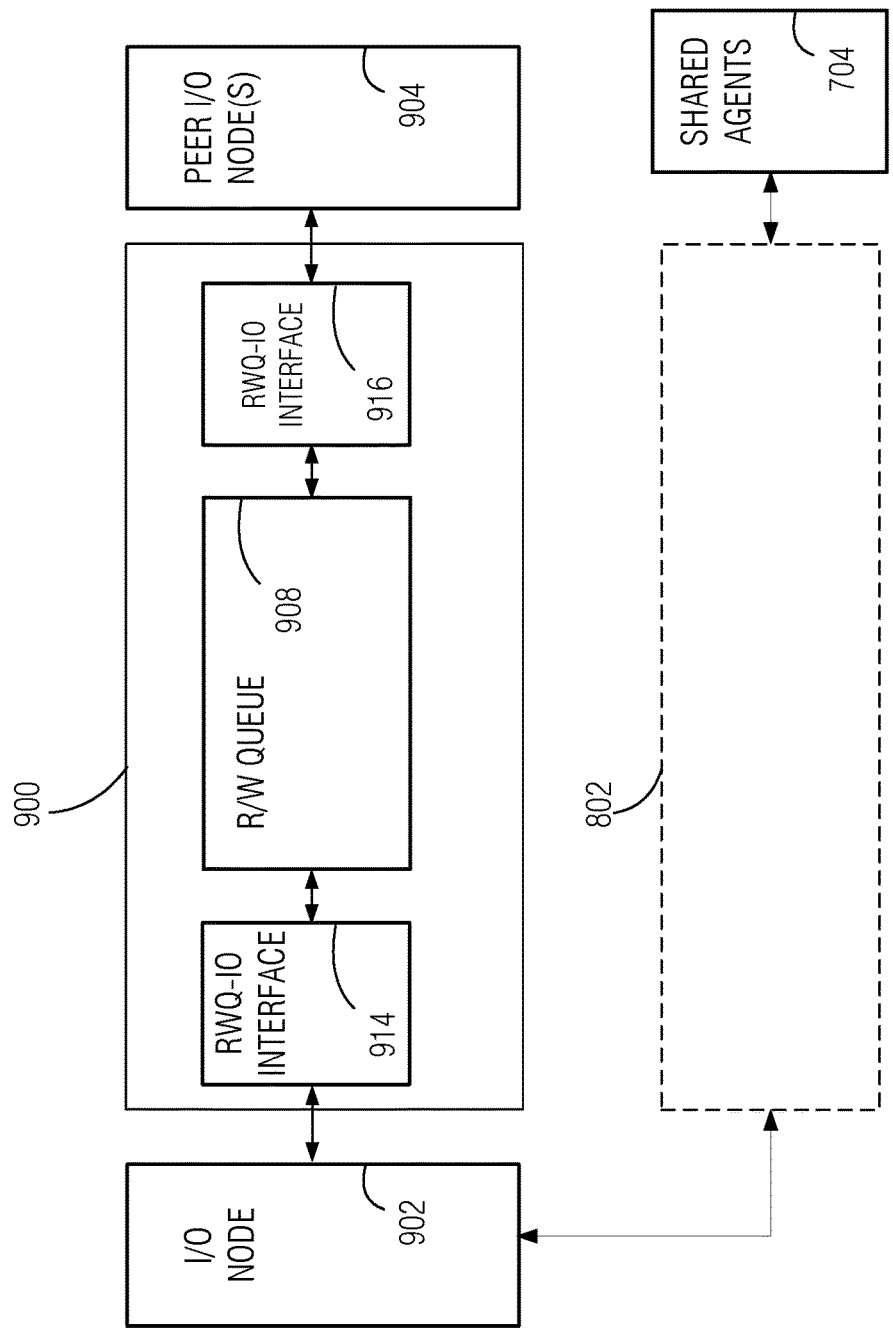
FIG. 9 is a block diagram illustrating a transparent redundancy manager for use with input/output (I/O) nodes according to a related embodiment.

FIG. 9 is a block diagram illustrating transparent redundancy manager 900 for use with input/output (I/O) nodes according to a related embodiment. I/O nodes 902 and 904 perform read and write operations over a system interconnect, as distinct from request, snoop, and response messaging as generally used in a CPU interface as described above. In some cases I/O nodes 902 and 904 may perform both, read/write operations, and request/response operations, as would be the case for I/O nodes that access a CPU interface in addition to a system interconnect.

I/O node 902 represents such entities as a memory controller, a bus or interconnect controller, a removable storage media controller, a disk drive controller, a network interface circuit (NIC), a graphics processor or display adapter controller, and the like, which perform read and write operations of data and may transmit control signaling such as acknowledgements (ACK/NACK), for example. I/O node 902 may or may not additionally access the level-3 cache or other entity that uses request/response messaging. Peer I/O node(s) 904 represents one or more entities that performs read and write operations, along with handling of control signaling, which is communicatively interfaced with I/O node 902.

Transparent redundancy manager 900 manages redundant operations for read and write operations in a similar manner, generally speaking, as transparent redundancy manager 802. Transparent redundancy manager 900 includes read/write queue 908, which includes memory that stores active read and write commands that have been redundantly duplicated. Read/write queue-IO interface logic 914 includes circuitry that receives read, write, or control signals from I/O node 902, determines whether redundant duplication is called for based on predefined address ranges, for instance, and passes the read, write, or control signaling to read/write queue 908 and to read/write queue-IO interface logic 916 for allocation to peer I/O nodes 904. Read/write queue-IO interface logic 914 may perform address translation or other encoding, may perform the response comparison operations, may remove entries from read/write queue 908 at the successful completion of a read or write operation, and may consolidate and forward a single response, such as an acknowledgement (ACK) for a write or a set of read data, from among the redundant responses. Read/write queue-IO interface logic 914 may also include a state machine that tracks and controls the sequence of operations involving read/write queue 908. Read/write queue-IO interface logic 916 is configured to duplicate and assign the read/write/control signaling to redundant peer I/O nodes 904, or to redundant addresses handled by a single peer I/O node 904, and obtains control signals (e.g., ACK) or data blocks, in response to those commands.

As illustrated, I/O node 902 may be further interfaced with transparent redundancy manager 802, which in turn is interfaced with shared agents 704. The example arrangement of FIG. 9 allows for the relatively slower interchanges between I/O node 902 and I/O nodes 904 to be handled separately from the relatively faster interchanges between I/O node 902 and shared agents 704.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment, or to different or mutually exclusive embodiments. Features of various embodiments may be combined in other embodiments.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Additional Notes and Examples

Example 1 is a coherent redundancy controller device, comprising: flow control circuitry to receive operational requests from a requestor node, wherein the operational requests are to be processed by shared agents to produce corresponding responses; request allocator circuitry coupled to the flow control circuitry and to duplicate a first request from among the operational requests to be redundantly processed independently and asynchronously by distinct ones of the shared agents to produce redundant counterpart responses including a first redundant response and a second redundant response; and response comparator circuitry coupled to the flow control circuitry and to compare the first redundant response against the second redundant response to produce a comparison result; wherein in response to the comparison result being indicative of a match between a first redundant response and the second redundant response, the flow control circuitry is to merge the first redundant response and the second redundant response to produce a single final response to the first request to be read by the requestor node; and wherein in response to the comparison result being indicative of a non-match between the first redundant response and the second redundant response, the flow control circuitry is to perform an exception response.

In Example 2, the subject matter of Example 1 includes, wherein the requestor node is a processor core.

In Example 3, the subject matter of Examples 1-2 includes, wherein the requestor node is an input/output agent of a computer system.

In Example 4, the subject matter of Examples 1-3 includes, wherein the operational requests include read and write requests.

In Example 5, the subject matter of Examples 1-4 includes, wherein the operational requests include cache access requests.

In Example 6, the subject matter of Examples 1-5 includes, wherein the operational requests include mission-critical requests and non-mission-critical requests, and wherein the flow control circuitry is to direct the mission-critical requests to the request allocator.

In Example 7, the subject matter of Example 6 includes, wherein the flow control circuitry is to cause the non-mission-critical requests to bypass the request allocator.

In Example 8, the subject matter of Examples 6-7 includes, wherein the mission-critical requests are associated with a preconfigured set of addresses, and wherein the flow control circuitry is to direct the mission-critical requests to the request allocator based on a comparison of addressing associated with each of the mission-critical requests against the preconfigured set of addresses.

In Example 9, the subject matter of Examples 1-8 includes, wherein the response comparator circuitry is to compute and store a first checksum of the first redundant response, and to compute a second checksum of the second redundant response and compare the first checksum against the second checksum to produce the comparison result.

In Example 10, the subject matter of Examples 1-9 includes, wherein the flow control circuitry is to interface with the requestor node such that the requestor node is unaware of any redundant processing of the operational requests.

In Example 11, the subject matter of Examples 1-10 includes, wherein the exception response includes suppressing the redundant counterpart responses from being accessed by the requestor node.

In Example 12, the subject matter of Examples 1-11 includes, wherein the exception response includes an initial retry wherein the flow control circuitry is to cause the request allocator circuitry to duplicate the first request from among the operational requests to be redundantly processed independently and asynchronously by the same shared agents that were previously used to redundantly process the first request, to produce retried redundant counterpart responses including a first retried redundant response and a second retried redundant response to be compared against the first retried redundant response.

In Example 13, the subject matter of Example 12 includes, wherein in response to a non-match between the first retried redundant response and the second retried redundant response, the flow control circuitry is to cause the request allocator circuitry to perform a fault-isolation test wherein the first request is redundantly processed independently and asynchronously different ones of the shared agents that were not previously used to redundantly process the first request, to produce tested redundant counterpart responses including a first tested redundant response and a second tested redundant response to be compared against the first tested redundant response.

In Example 14, the subject matter of Examples 1-13 includes, wherein the flow control circuitry, the request allocator circuitry, and the response comparator circuitry implement a transparent redundancy manager including a hardware—based super queue and a hardware-based snoop queue; wherein the super queue is to store identifiers of operational requests and associated responses during redundant processing of those respective requests by the shared agents; and wherein the snoop queue is to store snoop messages from the shared agents directed to the requestor node while those snoop messages are outstanding.

In Example 15, the subject matter of Examples 1-14 includes, wherein the flow control circuitry, the request allocator circuitry, and the response comparator circuitry are integrated on a common integrated circuit with the requestor node.

In Example 16, the subject matter of Example 15 includes, wherein the shared agents are integrated on a common integrated circuit with the requestor node.

In Example 17, the subject matter of Examples 1-16 includes, wherein the shared agents include a set of cache controllers.

In Example 18, the subject matter of Examples 1-17 includes, wherein the shared agents include a system agent.

In Example 19, the subject matter of Examples 1-18 includes, wherein the shared agents include an interconnect fabric controller.

Example 20 is a method of manufacturing a central processing unit (CPU) device, the method, comprising: forming a processor core; forming a plurality of shared agents; forming flow control circuitry to receive operational requests from a the processor core, wherein the operational requests are to be processed by the shared agents to produce corresponding responses; forming request allocator circuitry coupled to the flow control circuitry and to duplicate a first request from among the operational requests to be redundantly processed independently and asynchronously by distinct ones of the shared agents to produce redundant counterpart responses including a first redundant response and a second redundant response; and forming response comparator circuitry coupled to the flow control circuitry and to compare the first redundant response against the second redundant response to produce a comparison result; wherein the flow control circuitry is configured such that: in response to the comparison result being indicative of a match between a first redundant response and the second redundant response, the flow control circuitry is to merge the first redundant response and the second redundant response to produce a single final response to the first request to be read by the processor core; and wherein in response to the comparison result being indicative of a non-match between the first redundant response and the second redundant response, the flow control circuitry is to perform an exception response.

In Example 21, the subject matter of Example 20 includes, wherein the operational requests include cache access requests.

In Example 22, the subject matter of Examples 20-21 includes, wherein the operational requests include mission-critical requests and non-mission-critical requests, and wherein the flow control circuitry is to direct the mission-critical requests to the request allocator.

In Example 23, the subject matter of Example 22 includes, wherein forming the flow control circuitry includes configuring the flow control circuitry to cause the non-mission-critical requests to bypass the request allocator.

In Example 24, the subject matter of Examples 22-23 includes, wherein the mission-critical requests are associated with a preconfigured set of addresses, and wherein the flow control circuitry is to direct the mission-critical requests to the request allocator based on a comparison of addressing associated with each of the mission-critical requests against the preconfigured set of addresses.

In Example 25, the subject matter of Examples 20-24 includes, wherein forming the response comparator circuitry includes configuring the response comparator circuitry to compute and store a first checksum of the first redundant response, and to compute a second checksum of the second redundant response and compare the first checksum against the second checksum to produce the comparison result.

In Example 26, the subject matter of Examples 20-25 includes, wherein forming the flow control circuitry includes interfacing the flow control circuitry with the processor core such that the processor core is unaware of any redundant processing of the operational requests.

In Example 27, the subject matter of Examples 20-26 includes, wherein the exception response includes an initial retry wherein the flow control circuitry is to cause the request allocator circuitry to duplicate the first request from among the operational requests to be redundantly processed independently and asynchronously by the same shared agents that were previously used to redundantly process the first request, to produce retried redundant counterpart responses including a first retried redundant response and a second retried redundant response to be compared against the first retried redundant response.

In Example 28, the subject matter of Example 27 includes, wherein in response to a non-match between the first retried redundant response and the second retried redundant response, the flow control circuitry is to cause the request allocator circuitry to perform a fault-isolation test wherein the first request is redundantly processed independently and asynchronously different ones of the shared agents that were not previously used to redundantly process the first request, to produce tested redundant counterpart responses including a first tested redundant response and a second tested redundant response to be compared against the first tested redundant response.

In Example 29, the subject matter of Examples 20-28 includes, wherein forming the flow control circuitry, the request allocator circuitry, and the response comparator circuitry includes providing a hardware—based super queue and a hardware-based snoop queue; wherein the super queue is formed to store identifiers of operational requests and associated responses during redundant processing of those respective requests by the shared agents; and wherein the snoop queue is formed to store snoop messages from the shared agents directed to the processor core while those snoop messages are outstanding.

In Example 30, the subject matter of Examples 20-29 includes, wherein forming the shared agents includes providing a set of cache controllers.

In Example 31, the subject matter of Examples 20-30 includes, wherein forming the shared agents includes providing a system agent.

In Example 32, the subject matter of Examples 20-31 includes, wherein forming the shared agents includes providing an interconnect fabric controller.

Example 33 is a coherent redundancy controller system, comprising: flow control means for receiving operational requests from a requestor node, wherein the operational requests are to be processed by shared agents to produce corresponding responses; request allocator means for duplicating a first request from among the operational requests to be redundantly processed independently and asynchronously by distinct ones of the shared agents to produce redundant counterpart responses including a first redundant response and a second redundant response; and response comparator means for comparing the first redundant response against the second redundant response to produce a comparison result; wherein in response to the comparison result being indicative of a match between a first redundant response and the second redundant response, the flow control means are to merge the first redundant response and the second redundant response to produce a single final response to the first request to be read by the requestor node; and wherein in response to the comparison result being indicative of a non-match between the first redundant response and the second redundant response, the flow control means are to perform an exception response.

In Example 34, the subject matter of Example 33 includes, wherein the requestor node includes a processor core.

In Example 35, the subject matter of Examples 33-34 includes, wherein the requestor node includes an input/output agent of a computer system.

In Example 36, the subject matter of Examples 33-35 includes, wherein the operational requests include read and write requests.

In Example 37, the subject matter of Examples 33-36 includes, wherein the operational requests include cache access requests.

In Example 38, the subject matter of Examples 33-37 includes, wherein the operational requests include mission-critical requests and non-mission-critical requests, and wherein the flow control means are to direct the mission-critical requests to the request allocator.

In Example 39, the subject matter of Example 38 includes, wherein the flow control means includes means for causing the non-mission-critical requests to bypass the request allocator.

In Example 40, the subject matter of Examples 38-39 includes, wherein the mission-critical requests are associated with a preconfigured set of addresses, and wherein the flow control means include means for directing the mission-critical requests to the request allocator based on a comparison of addressing associated with each of the mission-critical requests against the preconfigured set of addresses.

In Example 41, the subject matter of Examples 33-40 includes, wherein the response comparator means include means for computing and storing a first checksum of the first redundant response, and means for computing a second checksum of the second redundant response and means for comparing the first checksum against the second checksum to produce the comparison result.

In Example 42, the subject matter of Examples 33-41 includes, wherein the flow control means are to interface with the requestor node such that the requestor node is unaware of any redundant processing of the operational requests.

In Example 43, the subject matter of Examples 33-42 includes, wherein the exception response includes an initial retry wherein the flow control means are to cause the request allocator means to duplicate the first request from among the operational requests to be redundantly processed independently and asynchronously by the same shared agents that were previously used to redundantly process the first request, to produce retried redundant counterpart responses including a first retried redundant response and a second retried redundant response to be compared against the first retried redundant response.

In Example 44, the subject matter of Example 43 includes, wherein in response to a non-match between the first retried redundant response and the second retried redundant response, the flow control means are to cause the request allocator means to perform a fault-isolation test wherein the first request is redundantly processed independently and asynchronously different ones of the shared agents that were not previously used to redundantly process the first request, to produce tested redundant counterpart responses including a first tested redundant response and a second tested redundant response to be compared against the first tested redundant response.

In Example 45, the subject matter of Examples 33-44 includes, wherein the flow control means, the request allocator means, and the response comparator means are to implement a transparent redundancy manager including a hardware—based super queue and a hardware-based snoop queue; wherein the super queue is to store identifiers of operational requests and associated responses during redundant processing of those respective requests by the shared agents; and wherein the snoop queue is to store snoop messages from the shared agents directed to the requestor node while those snoop messages are outstanding.

In Example 46, the subject matter of Examples 33-45 includes, wherein the flow control means, the request allocator means, and the response comparator means are integrated on a common integrated circuit with the requestor node.

In Example 47, the subject matter of Example 46 includes, wherein the shared agents are integrated on a common integrated circuit with the requestor node.

In Example 48, the subject matter of Examples 33-47 includes, wherein the shared agents include a set of cache controllers.

In Example 49, the subject matter of Examples 33-48 includes, wherein the shared agents include a system agent.

In Example 50, the subject matter of Examples 33-49 includes, wherein the shared agents include an interconnect fabric controller.

Example 51 is a method for operational fault detection within computing hardware, the method comprising: receiving operational requests from a requestor node, wherein the operational requests are to be processed by shared agents to produce corresponding responses; duplicating a first request from among the operational requests to be redundantly processed independently and asynchronously by distinct ones of the shared agents to produce redundant counterpart responses including a first redundant response and a second redundant response; and comparing the first redundant response against the second redundant response to produce a comparison result; in response to the comparison result being indicative of a match between a first redundant response and the second redundant response, merging the first redundant response and the second redundant response to produce a single final response to the first request to be read by the requestor node; and in response to the comparison result being indicative of a non-match between the first redundant response and the second redundant response, performing an exception response.

In Example 52, the subject matter of Example 51 includes, wherein the requestor node is a processor core.

In Example 53, the subject matter of Examples 51-52 includes, wherein the requestor node is an input/output agent of a computer system.

In Example 54, the subject matter of Examples 51-53 includes, wherein the operational requests include read and write requests.

In Example 55, the subject matter of Examples 51-54 includes, wherein the operational requests include cache access requests.

In Example 56, the subject matter of Examples 51-55 includes, wherein the operational requests include mission-critical requests and non-mission-critical requests, and wherein the method further comprises: directing the mission-critical requests to the request allocator.

In Example 57, the subject matter of Example 56 includes, directing the non-mission-critical requests to bypass the request allocator.

In Example 58, the subject matter of Examples 56-57 includes, wherein the mission-critical requests are associated with a preconfigured set of addresses, and further comprising: comparing addressing associated with each of the mission-critical requests against the preconfigured set of addresses.

In Example 59, the subject matter of Examples 51-58 includes, computing and storing a first checksum of the first redundant response, and a second checksum of the second redundant response; and comparing the first checksum against the second checksum to produce the comparison result.

In Example 60, the subject matter of Examples 51-59 includes, wherein the exception response includes suppressing the redundant counterpart responses from being accessed by the requestor node.

In Example 61, the subject matter of Examples 51-60 includes, wherein the exception response includes performing an initial retry wherein the first request from among the operational requests is to be redundantly processed independently and asynchronously by the same shared agents that were previously used to redundantly process the first request, to produce retried redundant counterpart responses including a first retried redundant response and a second retried redundant response to be compared against the first retried redundant response.

In Example 62, the subject matter of Example 61 includes, wherein in response to a non-match between the first retried redundant response and the second retried redundant response, a fault-isolation test is performed wherein the first request is redundantly processed independently and asynchronously different ones of the shared agents that were not previously used to redundantly process the first request, to produce tested redundant counterpart responses including a first tested redundant response and a second tested redundant response to be compared against the first tested redundant response.

In Example 63, the subject matter of Examples 51-62 includes, storing identifiers of operational requests and associated responses during redundant processing of those respective requests by the shared agents; and storing snoop messages from the shared agents directed to the requestor node while those snoop messages are outstanding.

In Example 64, the subject matter of Examples 51-63 includes, wherein the shared agents include a set of cache controllers.

In Example 65, the subject matter of Examples 51-64 includes, wherein the shared agents include a system agent.

In Example 66, the subject matter of Examples 51-65 includes, wherein the shared agents include an interconnect fabric controller.

Example 67 is a computer system having a fault-management architecture, the system, comprising: a processor core; memory and input/output facilities communicatively coupled to the core via shared agents; flow control circuitry to receive operational requests from the core, wherein the operational requests are to be processed by the shared agents to produce corresponding responses; request allocator circuitry coupled to the flow control circuitry and to duplicate a first request from among the operational requests to be redundantly processed independently and asynchronously by distinct ones of the shared agents to produce redundant counterpart responses including a first redundant response and a second redundant response; and response comparator circuitry coupled to the flow control circuitry and to compare the first redundant response against the second redundant response to produce a comparison result; wherein in response to the comparison result being indicative of a match between a first redundant response and the second redundant response, the flow control circuitry is to merge the first redundant response and the second redundant response to produce a single final response to the first request to be read by the core; and wherein in response to the comparison result being indicative of a non-match between the first redundant response and the second redundant response, the flow control circuitry is to perform an exception response.

In Example 68, the subject matter of Example 67 includes, wherein the operational requests include read and write requests.

In Example 69, the subject matter of Examples 67-68 includes, wherein the operational requests include cache access requests.

In Example 70, the subject matter of Examples 67-69 includes, wherein the operational requests include mission-critical requests and non-mission-critical requests, and wherein the flow control circuitry is to direct the mission-critical requests to the request allocator.

In Example 71, the subject matter of Example 70 includes, wherein the flow control circuitry is to cause the non-mission-critical requests to bypass the request allocator.

In Example 72, the subject matter of Examples 70-71 includes, wherein the mission-critical requests are associated with a preconfigured set of addresses, and wherein the flow control circuitry is to direct the mission-critical requests to the request allocator based on a comparison of addressing associated with each of the mission-critical requests against the preconfigured set of addresses.

In Example 73, the subject matter of Examples 67-72 includes, wherein the response comparator circuitry is to compute and store a first checksum of the first redundant response, and to compute a second checksum of the second redundant response and compare the first checksum against the second checksum to produce the comparison result.

In Example 74, the subject matter of Examples 67-73 includes, wherein the flow control circuitry is to interface with the core such that the core is unaware of any redundant processing of the operational requests.

In Example 75, the subject matter of Examples 67-74 includes, wherein the exception response includes suppressing the redundant counterpart responses from being accessed by the core.

In Example 76, the subject matter of Examples 67-75 includes, wherein the exception response includes an initial retry wherein the flow control circuitry is to cause the request allocator circuitry to duplicate the first request from among the operational requests to be redundantly processed independently and asynchronously by the same shared agents that were previously used to redundantly process the first request, to produce retried redundant counterpart responses including a first retried redundant response and a second retried redundant response to be compared against the first retried redundant response.

In Example 77, the subject matter of Example 76 includes, wherein in response to a non-match between the first retried redundant response and the second retried redundant response, the flow control circuitry is to cause the request allocator circuitry to perform a fault-isolation test wherein the first request is redundantly processed independently and asynchronously different ones of the shared agents that were not previously used to redundantly process the first request, to produce tested redundant counterpart responses including a first tested redundant response and a second tested redundant response to be compared against the first tested redundant response.

In Example 78, the subject matter of Examples 67-77 includes, wherein the flow control circuitry, the request allocator circuitry, and the response comparator circuitry implement a transparent redundancy manager including a hardware—based super queue and a hardware-based snoop queue; wherein the super queue is to store identifiers of operational requests and associated responses during redundant processing of those respective requests by the shared agents; and wherein the snoop queue is to store snoop messages from the shared agents directed to the core while those snoop messages are outstanding.

In Example 79, the subject matter of Examples 67-78 includes, wherein the flow control circuitry, the request allocator circuitry, and the response comparator circuitry are integrated on a common integrated circuit with the core.

In Example 80, the subject matter of Example 79 includes, wherein the shared agents are integrated on a common integrated circuit with the core.

In Example 81, the subject matter of Examples 67-80 includes, wherein the shared agents include a set of cache controllers.

In Example 82, the subject matter of Examples 67-81 includes, wherein the shared agents include a system agent.

In Example 83, the subject matter of Examples 67-82 includes, wherein the shared agents include an interconnect fabric controller.

Example 84 is at least one machine-readable medium including instructions that, when executed by processing circuitry, cause the processing circuitry to perform operations to implement of any of Examples 1-83.

Example 85 is an apparatus comprising means to implement of any of Examples 1-83.

Example 86 is a system to implement of any of Examples 1-83.

Example 87 is a method to implement of any of Examples 1-83.

The techniques described herein are not limited to any particular hardware or software configuration; they may find applicability in any computing, consumer electronics, or processing environment. The techniques may be implemented in hardware, software, firmware or a combination, resulting in logic or circuitry which supports execution or performance of embodiments described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

While this subject matter has been described with reference to illustrative embodiments, this description is not intended to be construed in a limiting or restrictive sense. For example, the above-described examples (or one or more aspects thereof) may be used in combination with others. Other embodiments may be used, such as will be understood by one of ordinary skill in the art upon reviewing the disclosure herein. The Abstract is to allow the reader to quickly discover the nature of the technical disclosure. However, the Abstract is submitted with the understanding that it will not be used to interpret or limit the scope or meaning of the claims.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A coherent redundancy controller device, comprising:
   flow control circuitry to receive operational requests from a requestor node, wherein the operational requests are to be processed by shared agents to produce corresponding responses;
   request allocator circuitry coupled to the flow control circuitry and configured to duplicate a first request from among the operational requests to be redundantly processed independently and asynchronously by distinct ones of the shared agents to produce redundant counterpart responses including a first redundant response and a second redundant response; and
   response comparator circuitry coupled to the flow control circuitry and configured to compare the first redundant response against the second redundant response to produce a comparison result;
   wherein in response to the comparison result being indicative of a match between a first redundant response and the second redundant response, the flow control circuitry is to merge the first redundant response and the second redundant response to produce a single final response to the first request to be read by the requestor node; and
   wherein in response to the comparison result being indicative of a non-match between the first redundant response and the second redundant response, the flow control circuitry is to perform an exception response.

2. The coherent redundancy controller device of claim 1, wherein the requestor node is a processor core.

3. The coherent redundancy controller device of claim 1, wherein the requestor node is an input/output agent of a computer system.

4. The coherent redundancy controller device of claim 1, wherein the operational requests include mission-critical requests and non-mission-critical requests, and wherein the flow control circuitry is to direct the mission-critical requests to the request allocator.

5. The coherent redundancy controller device of claim 4, wherein the flow control circuitry is to cause the non-mission-critical requests to bypass the request allocator.

6. The coherent redundancy controller device of claim 4, wherein the mission-critical requests are associated with a preconfigured set of addresses, and wherein the flow control circuitry is to direct the mission-critical requests to the request allocator based on a comparison of addressing associated with each of the mission-critical requests against the preconfigured set of addresses.

7. The coherent redundancy controller device of claim 1, wherein the response comparator circuitry is to compute and store a first checksum of the first redundant response, and to compute a second checksum of the second redundant response and compare the first checksum against the second checksum to produce the comparison result.

8. The coherent redundancy controller device of claim 1, wherein the flow control circuitry is to interface with the requestor node such that the requestor node is unaware of any redundant processing of the operational requests.

9. The coherent redundancy controller device of claim 1, wherein the exception response includes suppressing the redundant counterpart responses from being accessed by the requestor node.

10. The coherent redundancy controller device of claim 1, wherein the exception response includes an initial retry wherein the flow control circuitry is to cause the request allocator circuitry to duplicate the first request from among the operational requests to be redundantly processed independently and asynchronously by the same shared agents that were previously used to redundantly process the first request, to produce retried redundant counterpart responses including a first retried redundant response and a second retried redundant response to be compared against the first retried redundant response.

11. The coherent redundancy controller device of claim 10, wherein in response to a non-match between the first retried redundant response and the second retried redundant response, the flow control circuitry is to cause the request allocator circuitry to perform a fault-isolation test wherein the first request is redundantly processed independently and asynchronously different ones of the shared agents that were not previously used to redundantly process the first request, to produce tested redundant counterpart responses including a first tested redundant response and a second tested redundant response to be compared against the first tested redundant response.

12. The coherent redundancy controller device of claim 1, wherein the flow control circuitry, the request allocator circuitry, and the response comparator circuitry implement a transparent redundancy manager including a hardware-based super queue and a hardware-based snoop queue;
wherein the super queue is to store identifiers of operational requests and associated responses during redundant processing of those respective requests by the shared agents; and
wherein the snoop queue is to store snoop messages from the shared agents directed to the requestor node while those snoop messages are outstanding.

13. The coherent redundancy controller device of claim 1, wherein the flow control circuitry, the request allocator circuitry, and the response comparator circuitry are integrated on a common integrated circuit with the requestor node.

14. The coherent redundancy controller device of claim 13, wherein the shared agents are integrated on a common integrated circuit with the requestor node.

15. The coherent redundancy controller device of claim 1, wherein the shared agents include a set of cache controllers.

16. A method of manufacturing a central processing unit (CPU) device, the method, comprising:
forming a processor core;
forming a plurality of shared agents;
forming flow control circuitry configured to receive operational requests from a the processor core, wherein the operational requests are to be processed by the shared agents to produce corresponding responses;
forming request allocator circuitry coupled to the flow control circuitry and configured to duplicate a first request from among the operational requests to be redundantly processed independently and asynchronously by distinct ones of the shared agents to produce redundant counterpart responses including a first redundant response and a second redundant response; and
forming response comparator circuitry coupled to the flow control circuitry and configured to compare the first redundant response against the second redundant response to produce a comparison result;
wherein the flow control circuitry is configured such that:
in response to the comparison result being indicative of a match between a first redundant response and the second redundant response, the flow control circuitry is to merge the first redundant response and the second redundant response to produce a single final response to the first request to be read by the processor core; and
wherein in response to the comparison result being indicative of a non-match between the first redundant response and the second redundant response, the flow control circuitry is to perform an exception response.

17. The method of claim 16, wherein the operational requests include mission-critical requests and non-mission-critical requests, and wherein the flow control circuitry is to direct the mission-critical requests to the request allocator.

18. The method of claim 16, wherein forming the flow control circuitry includes interfacing the flow control circuitry with the processor core such that the processor core is unaware of any redundant processing of the operational requests.

19. The method of claim 16, wherein the exception response includes an initial retry wherein the flow control circuitry is to cause the request allocator circuitry to duplicate the first request from among the operational requests to be redundantly processed independently and asynchronously by the same shared agents that were previously used to redundantly process the first request, to produce retried redundant counterpart responses including a first retried redundant response and a second retried redundant response to be compared against the first retried redundant response.

20. The method of claim 19, wherein in response to a non-match between the first retried redundant response and the second retried redundant response, the flow control circuitry is to cause the request allocator circuitry to perform a fault-isolation test wherein the first request is redundantly processed independently and asynchronously different ones of the shared agents that were not previously used to redundantly process the first request, to produce tested redundant counterpart responses including a first tested redundant response and a second tested redundant response to be compared against the first tested redundant response.

21. A computer system having a fault-management architecture, the system, comprising:
a processor core;
memory and input/output facilities communicatively coupled to the core via shared agents;
flow control circuitry to receive operational requests from the core, wherein the operational requests are to be processed by the shared agents to produce corresponding responses;
request allocator circuitry coupled to the flow control circuitry and to duplicate a first request from among the operational requests to be redundantly processed independently and asynchronously by distinct ones of the shared agents to produce redundant counterpart responses including a first redundant response and a second redundant response; and
response comparator circuitry coupled to the flow control circuitry and to compare the first redundant response against the second redundant response to produce a comparison result;
wherein in response to the comparison result being indicative of a match between a first redundant response and the second redundant response, the flow control circuitry is to merge the first redundant response and the second redundant response to produce a single final response to the first request to be read by the core; and
wherein in response to the comparison result being indicative of a non-match between the first redundant response and the second redundant response, the flow control circuitry is to perform an exception response.

22. The system of claim 21, wherein the operational requests include mission-critical requests and non-missioncritical requests, and wherein the flow control circuitry is to direct the mission-critical requests to the request allocator.

23. The system of claim 21, wherein the flow control circuitry is to interface with the core such that the core is unaware of any redundant processing of the operational requests.

24. The system of claim 21, wherein the exception response includes an initial retry wherein the flow control circuitry is to cause the request allocator circuitry to duplicate the first request from among the operational requests to be redundantly processed independently and asynchronously by the same shared agents that were previously used to redundantly process the first request, to produce retried redundant counterpart responses including a first retried redundant response and a second retried redundant response to be compared against the first retried redundant response.

25. The system of claim 24, wherein in response to a non-match between the first retried redundant response and the second retried redundant response, the flow control circuitry is to cause the request allocator circuitry to perform a fault-isolation test wherein the first request is redundantly processed independently and asynchronously different ones of the shared agents that were not previously used to redundantly process the first request, to produce tested redundant counterpart responses including a first tested redundant response and a second tested redundant response to be compared against the first tested redundant response.

* * * * *